(12) United States Patent
Mitarai

(10) Patent No.: US 12,360,335 B2
(45) Date of Patent: Jul. 15, 2025

(54) OPTICAL SYSTEM, LENS DEVICE, IMAGING DEVICE, AND PROJECTION DEVICE

(71) Applicant: FUJIFILM Corporation, Tokyo (JP)

(72) Inventor: Tsuyoshi Mitarai, Saitama (JP)

(73) Assignee: FUJIFILM Corporation, Tokyo (JP)

( * ) Notice: Subject to any disclaimer, the term of this patent is extended or adjusted under 35 U.S.C. 154(b) by 367 days.

(21) Appl. No.: 17/855,803

(22) Filed: Jul. 1, 2022

(65) Prior Publication Data

US 2023/0034081 A1   Feb. 2, 2023

(30) Foreign Application Priority Data

Jul. 27, 2021  (JP) .................. 2021-122603

(51) Int. Cl.
*G02B 7/16*     (2021.01)
*G02B 21/24*    (2006.01)
*G02B 26/00*    (2006.01)

(52) U.S. Cl.
CPC ............. *G02B 7/16* (2013.01); *G02B 21/248* (2013.01); *G02B 26/007* (2013.01)

(58) Field of Classification Search
CPC ....... G02B 7/16; G02B 21/248; G02B 26/007
USPC ............................................ 359/381
See application file for complete search history.

(56) References Cited

U.S. PATENT DOCUMENTS

| | | |
|---|---|---|
| 6,154,312 A | 11/2000 | Takahama et al. |
| 6,414,805 B1 | 7/2002 | Reichman et al. |
| 2007/0024618 A1 | 2/2007 | Ajito et al. |
| 2008/0079812 A1* | 4/2008 | Yamamoto ............. H04N 23/55 348/207.99 |
| 2010/0110262 A1* | 5/2010 | Shirono ................. H04N 23/55 348/311 |
| 2011/0205420 A1* | 8/2011 | Nakamura ............. G03B 11/00 348/335 |
| 2017/0330327 A1* | 11/2017 | Ippolito ............... G02B 21/367 |

FOREIGN PATENT DOCUMENTS

| | | |
|---|---|---|
| JP | S5214440 | 2/1977 |
| JP | H1195087 | 4/1999 |
| JP | 2001208981 | 8/2001 |
| JP | 2006276433 | 10/2006 |
| JP | 2007042318 | 2/2007 |
| JP | 2011205587 | 10/2011 |

(Continued)

OTHER PUBLICATIONS

JP-2016045264—English translation.*

(Continued)

*Primary Examiner* — Sharrief I Broome
(74) *Attorney, Agent, or Firm* — JCIPRNET

(57) ABSTRACT

An optical system is disposed on an opposite side to an object side with respect to an objective lens, and includes: a rotational movement member that is rotationally movably supported; and a plurality of light transmissive regions that are formed in the rotational movement member, are configured to be able to be disposed at a position intersecting an optical axis of the objective lens, and have different light transmission characteristics, and a rotational movement axis of the rotational movement member is configured to be non-parallel with the optical axis of the objective lens.

15 Claims, 15 Drawing Sheets

(56) References Cited

FOREIGN PATENT DOCUMENTS

| | | | |
|---|---|---|---|
| JP | 2015014755 | | 1/2015 |
| JP | 2016045264 | | 4/2016 |
| JP | 2016045264 A | * | 4/2016 |
| JP | 2019117330 | | 7/2019 |
| JP | 2019523897 | | 8/2019 |

OTHER PUBLICATIONS

"Notice of Reasons for Refusal of Japan Counterpart Application", issued on Oct. 22, 2024, with English translation thereof, p. 1-p. 5.

* cited by examiner

OPTICAL SYSTEM, LENS DEVICE, IMAGING DEVICE, AND PROJECTION DEVICE

CROSS-REFERENCE TO RELATED APPLICATION

The present application claims priority under 35 U.S.C. § 119 to Japanese Patent Application No. 2021-122603, filed on Jul. 27, 2021. This Japanese Patent Application is hereby expressly incorporated by reference, in its entirety, into the present application.

BACKGROUND OF THE INVENTION

1. Field of the Invention

The present invention relates to an optical system, a lens device, an imaging device, and a projection device.

2. Description of the Related Art

JP2007-042318A describes a multi-spectra illumination environment imaging device comprising an image-forming lens that receives reflected light of an illumination environment from a convex mirror to form an image, a filter turret that sequentially positions a plurality of filters held on the same circumference in an optical path of the image-forming lens to modulate a spectral characteristic of light, and an imaging element that is disposed at an image-forming position of the image-forming lens to receive reflected light of the illumination environment as an image signal.

JP2006-276433A describes a calibration camera comprising an imaging optical system that has a fisheye lens disposed on a subject side, a turret plate that is provided with six holes at regular intervals in a circumferential direction, curved surface filters that are mounted in five holes among six holes of the turret plate, a turret shaft that rotatably supports the turret plate, and a motor that rotates the turret plate around the turret shaft.

JP2019-523897A describes a transmitted light condensing device having a turret in which a plurality of objective lenses are disposed.

JP1999-095087A (JP-H11-095087A) described an optical device including a turret that has an objective lens attachment portion where five objective lenses having different magnifications are mountable. A rotation axis of the turret has an inclination of 15 degrees with respect to an observation optical axis to move the objective lenses other than the objective lens for observation away from an observation sample.

JP2015-014755A describes a confocal laser scanning microscope having a filter turret that holds a plurality of notch filters, and a substantially disc-shaped mirror turret that holds a plurality of excitation dichroic mirror, in which an optical axis of the mirror turret is disposed at a predetermined angle with respect to an optical path.

JP2001-208981A describes a fluorescence microscope comprising a filter turret that has a turret type switching mechanism. The turret has a truncated pyramid shape having eight pyramidal shapes with a rotation axis as a central axis, a dichroic mirror is disposed on each pyramidal surface, and an absorption filter is disposed on a horizontal plane.

SUMMARY OF THE INVENTION

An object of the present invention is to provide an optical system capable of forming an optical condition depending on a purpose, and a lens device, an imaging device, and a projection device comprising the optical system.

An optical system according to an aspect of the present invention that is disposed on an opposite side to an object side with respect to an objective lens comprises a rotational movement member that is rotationally movably supported, and a plurality of light transmissive regions that are formed in the rotational movement member, are configured to be able to be disposed at a position intersecting an optical axis of the objective lens, and have different light transmission characteristics, in which a rotational movement axis of the rotational movement member is configured to be non-parallel with the optical axis of the objective lens.

According to the present invention, it is possible to provide an optical system capable of forming an optical condition depending on a purpose, and a lens device, an imaging device, and a projection device comprising the optical system.

DESCRIPTION OF THE PREFERRED EMBODIMENTS

Figure 1:
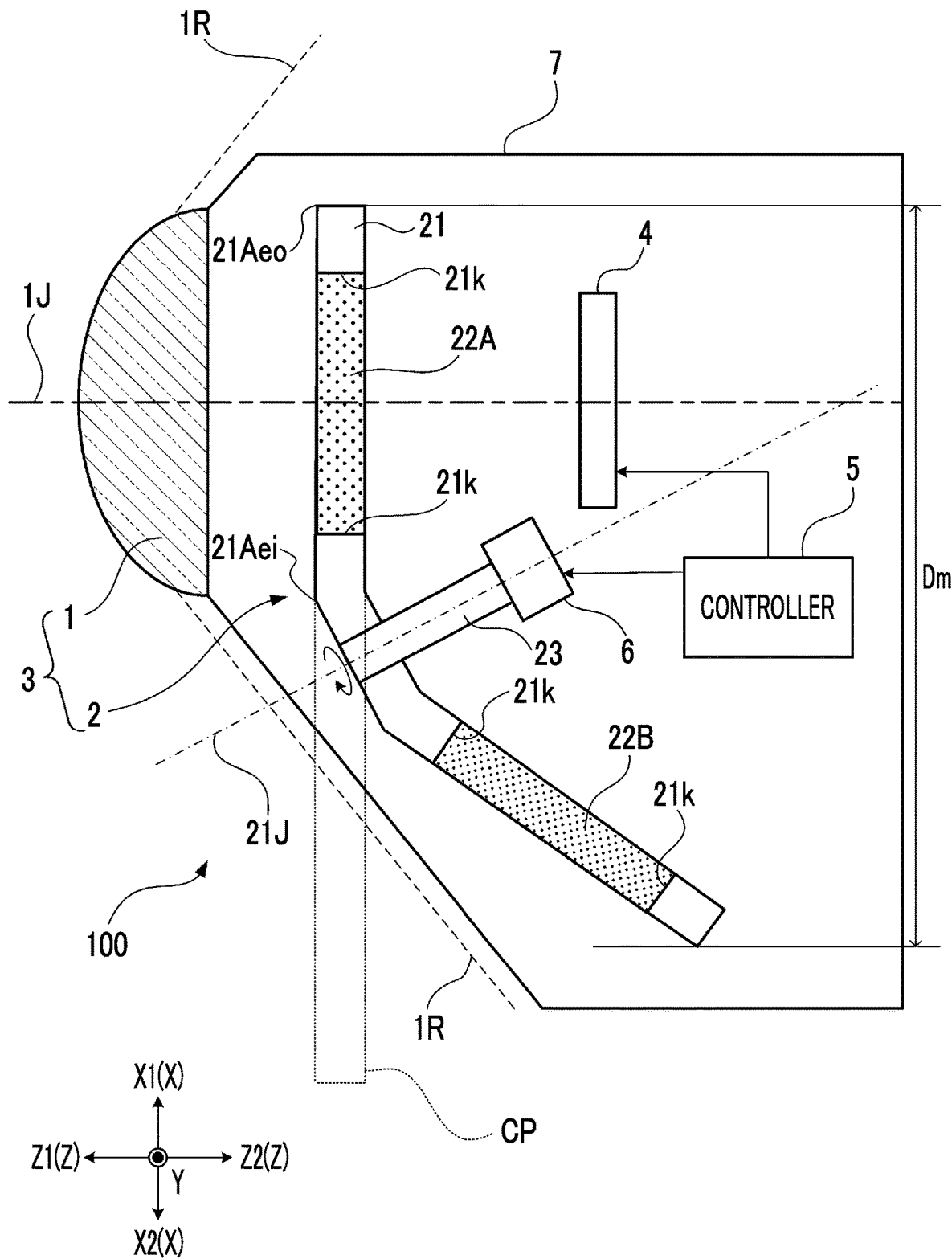
FIG. 1 is a schematic view showing the schematic configuration of an imaging device 100 that is an embodiment of an imaging device of the present invention.

FIG. 1 is a schematic view showing the schematic configuration of an imaging device 100 that is an embodiment of an imaging device of the present invention. The imaging device 100 is a digital camera, an imaging unit of an endoscope, or the like, and has an objective lens 1 as an optical element disposed on the most subject side. FIG. 1 schematically shows a cross section including an optical axis 1J of the objective lens 1.

Hereinafter, an extension direction of the optical axis 1J of the objective lens 1 is described as an optical axis direction Z. In the optical axis direction Z, a direction from the imaging device 100 toward a subject is described as a direction Z1, and an opposite direction of the direction Z1 is described as a direction Z2. Two directions that are perpendicular to the optical axis direction Z and are perpendicular to each other are described as a direction X and a direction Y. The direction Y configures a first direction, and the direction X configures a second direction. One side of the direction X is described as a direction X1, and the other side of the direction X is described as a direction X2. One side of the direction Y is described as a direction Y1, and the other side of the direction Y is described as a direction Y2. The cross section of the imaging device 100 shown in FIG. 1 is a plane parallel to an XZ plane indicated by a coordinate axis extending in the optical axis direction Z and a coordinate axis extending in the direction X.

As shown in FIG. 1, the imaging device 100 comprises a lens device 3 that includes at least an objective lens 1 and an optical element 2, an imaging element 4 that images a subject through the lens device 3 and is configured of a charge coupled device (CCD) image sensor or a complementary metal oxide semiconductor (CMOS) image sensor, a drive unit 6 that includes an actuator, such as a motor or a solenoid, a controller 5 that includes a processor configured to control the imaging element 4, control the drive unit 6, and execute processing of a signal output from the imaging element 4, and a housing 7 that accommodates the lens device 3, the imaging element 4, the drive unit 6, and the controller 5. Though not shown in FIG. 1, other optical elements, such as one or more lenses, a prism, a mirror, and a stop, can be disposed between the objective lens 1 and the imaging element 4. An optical system is configured of at least the optical element 2 among the other optical elements and the optical element 2, and the lens device 3 is configured of the optical system and the objective lens 1.

The objective lens 1 is a so-called fisheye lens of which a full angle of view exceeds 180 degrees. A ray 1R shown in FIG. 1 indicates a ray that is incident on an outermost edge of a range of an effective diameter of the objective lens 1, among rays from the subject to be condensable by the objective lens 1.

The optical element 2 switches an amount, a wavelength, a spatial frequency, a vibration direction, or the like of subject light that should be condensed by the objective lens 1 and reach the imaging element 4, in a plurality of patterns. The optical element 2 is provided in such a manner that a part can be disposed on an optical path of a ray that passes through the objective lens 1 and reaches the imaging element 4.

The optical element 2 comprises a non-flat plate-shaped (in the example of FIG. 1, a cross section has a substantially V shape) rotational movement member 21 that is rotationally movably supported, four light transmissive regions (filter 22A to filter 22D described below) that are formed in the rotational movement member 21, are configured to be able to be disposed at a position intersecting the optical axis 1J of the objective lens 1, and have different light transmission characteristics, and a columnar shaft member 23 that forms a rotational movement axis 21J of the rotational movement member 21. The light transmission characteristic refers to light transmittance, a wavelength of transmitted light, a spatial frequency of transmitted light, a vibration direction of transmitted light, and the like.

The shaft member 23 is adhered to the rotational movement member 21 and is rotationally driven with power from the actuator included in the drive unit 6. The drive unit 6 is supported in the housing 7. That is, the rotational movement member 21 is rotationally movably supported in the housing 7 through the drive unit 6.

Figure 9:
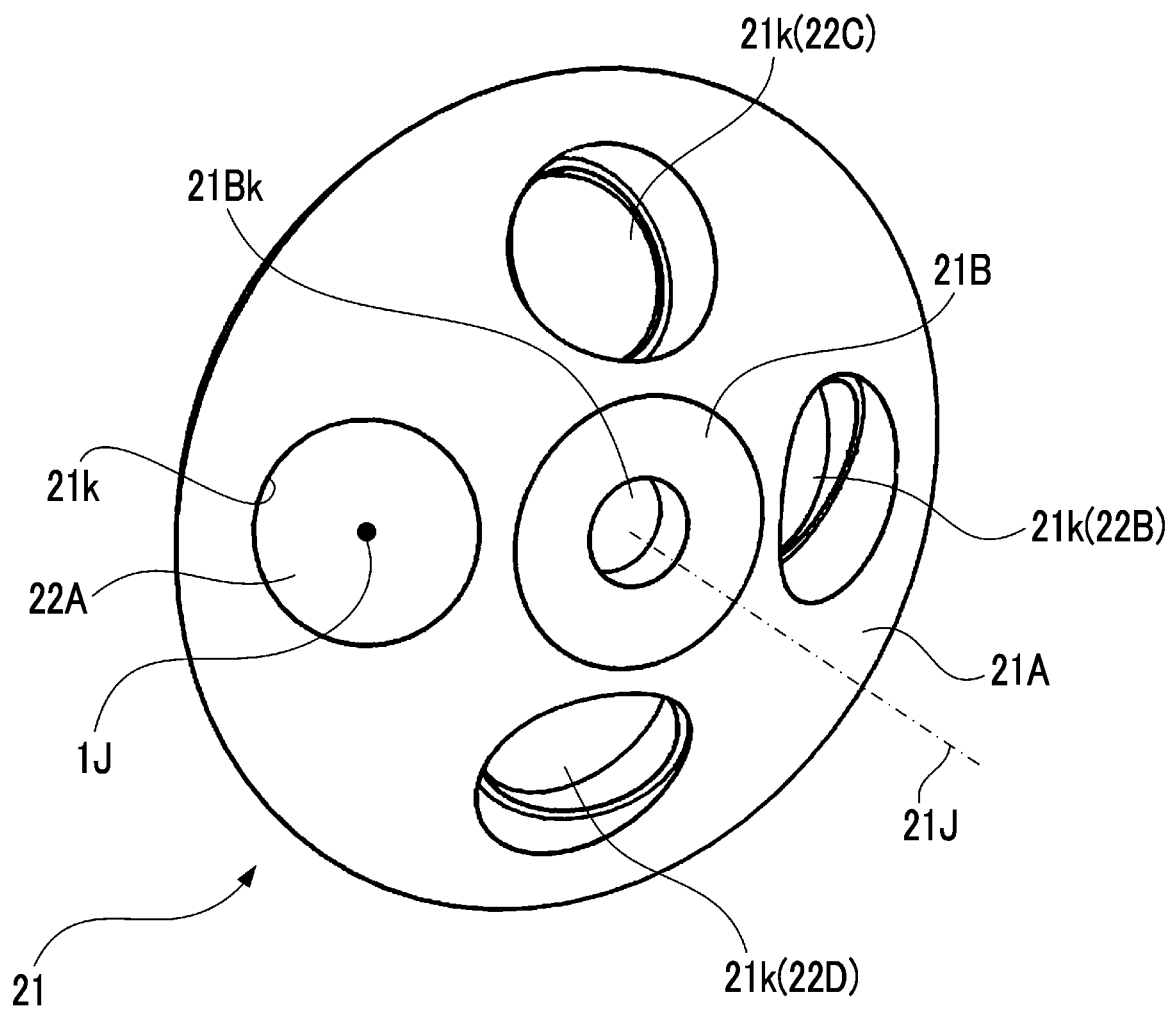
FIG. 9 is a schematic view showing a modification example of the rotational movement member 21 shown in FIG. 2.

The optical axis 1J of the objective lens 1 and the rotational movement axis 21J of the rotational movement member 21 are non-parallel with each other. In other words, the optical axis direction Z and an extension direction (hereinafter, referred to as a rotational movement axis direction) of the rotational movement axis 21J are different. A case where two axes are non-parallel with each other refers to a case where the two axes are not on the same plane or a case where the two axes are on the same plane and the two axes or extension lines thereof intersect each other. In the example of FIG. 1, the optical axis 1J and the rotational movement axis 21J are on the same plane (XZ plane), and the rotational movement axis 21J is inclined to the direction X2 side with respect to the optical axis 1J, such that the optical axis 1J and the rotational movement axis 21J are configured to intersect each other on the imaging element 4 side with respect to the objective lens 1. The optical axis 1J and the rotational movement axis 21J need not to be on the same plane, and may be on an XZ plane while positions in the direction Y are different. Alternatively, as in a modification example of the rotational movement member 21 shown in FIG. 9, the rotational movement axis 21J may intersect the XZ plane including the optical axis 1J. That is, the optical axis 1J and the rotational movement axis 21J may be configured to be in a twisted relationship.

Figure 2:
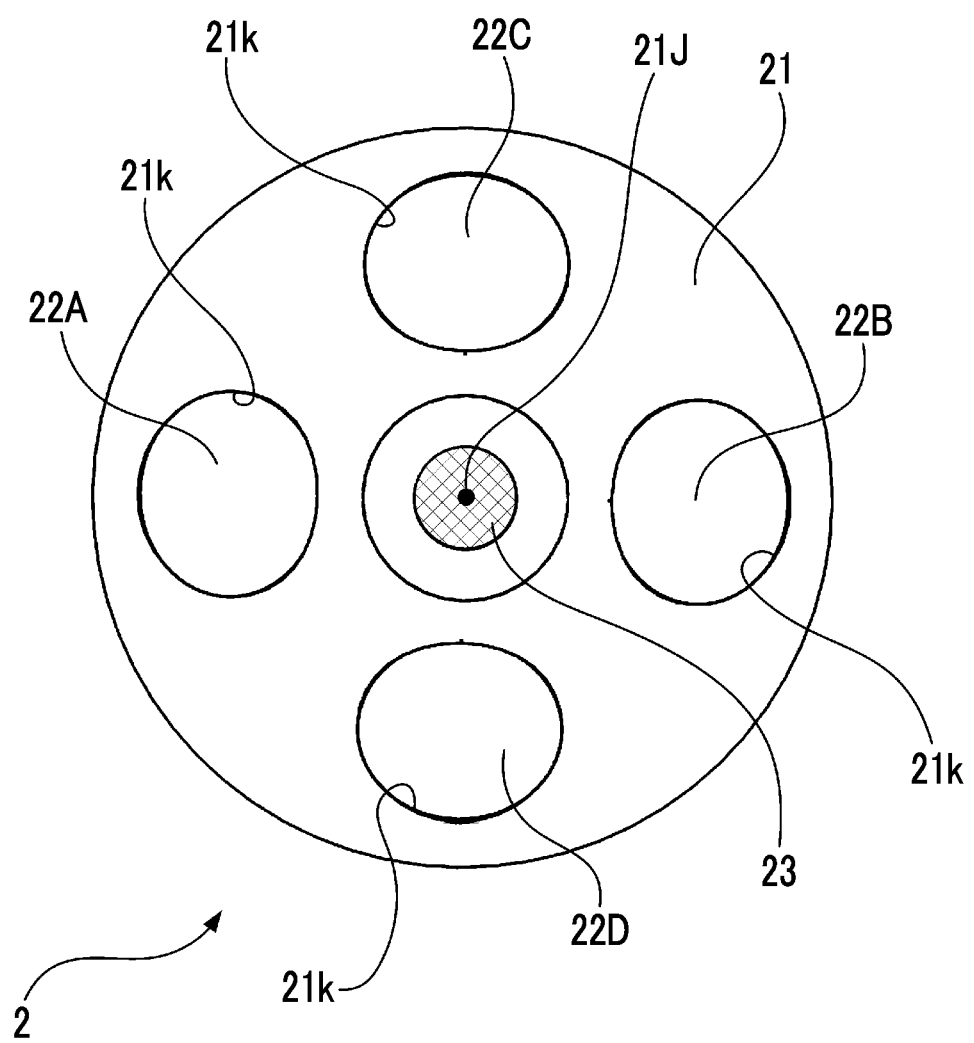
FIG. 2 is a schematic view of an optical element 2 shown in FIG. 1 as viewed in a rotational movement axis direction from an objective lens 1 side.

FIG. 2 is a schematic view of the optical element 2 shown in FIG. 1 as viewed in the rotational movement axis direction from an objective lens 1 side. In a state of being viewed in the rotational movement axis direction, the rotational movement member 21 is in an annular shape. The shaft member 23 is adhered to an inner peripheral portion of the rotational movement member 21, and a central axial line of the shaft member 23 configures the rotational movement axis 21J.

In the rotational movement member 21, four openings 21k that pass through the rotational movement member 21 are disposed at regular intervals in a peripheral direction. Flat plate-shaped filters (filter 22A, filter 22B, filter 22C, and filter 22D) are fitted into the four openings 21k, respectively. The four filters are configured of four neutral density (ND) filters having different light transmittance, four spectral filters having different light transmission wavelengths, four optical low-pass filters having different spatial frequencies of light transmitted therethrough, four polarizing filters having different vibration directions of light, or the like. The four filters may be configured by combining two or more of an ND filter, a spectral filter, an optical low-pass filter, and a polarizing filter. Alternatively, one of the four filters may be deleted to leave the opening 21k as it is or one of the four filters may be changed to glass where incident light is substantially equal to transmitted light. The filters, the glass, and the opening 21k with no filter and glass configure light transmissive regions formed in the rotational movement member 21, respectively.

Each time the rotational movement member 21 rotationally moves by 90 degrees around the rotational movement axis 21J, any one of the filter 22A, the filter 22B, the filter 22C, or the filter 22D is disposed on an optical path including the optical axis 1J in a state of intersecting (in the example of FIG. 1, perpendicular to) the optical axis 1J of the objective lens 1. Accordingly, the type of the filter (light transmissive region) that is made to intersect the optical axis 1J is changed, whereby it is possible to perform imaging of the subject depending on purposes.

For example, an imaging element that can perform color imaging is used as the imaging element 4, and four ND filters having different light transmittance are provided as the four filters that are formed in the rotational movement member 21, whereby it is possible to realize the imaging device 100 capable of coping with change in brightness of the subject.

For example, an imaging element that can perform imaging from an ultraviolet region to an infrared region is used as the imaging element 4, and a spectral filter that transmits red light, a spectral filter that transmits green light, a spectral filter that transmits green light, a spectral filter that transmits blue light, for obtaining a visible light image, and a spectral filter for obtaining a fluorescent image are provided as the four filters that are formed in the rotational movement member 21, whereby it is possible to apply the imaging device 100 to an endoscope to switch between normal observation and special light observation.

Figure 3:
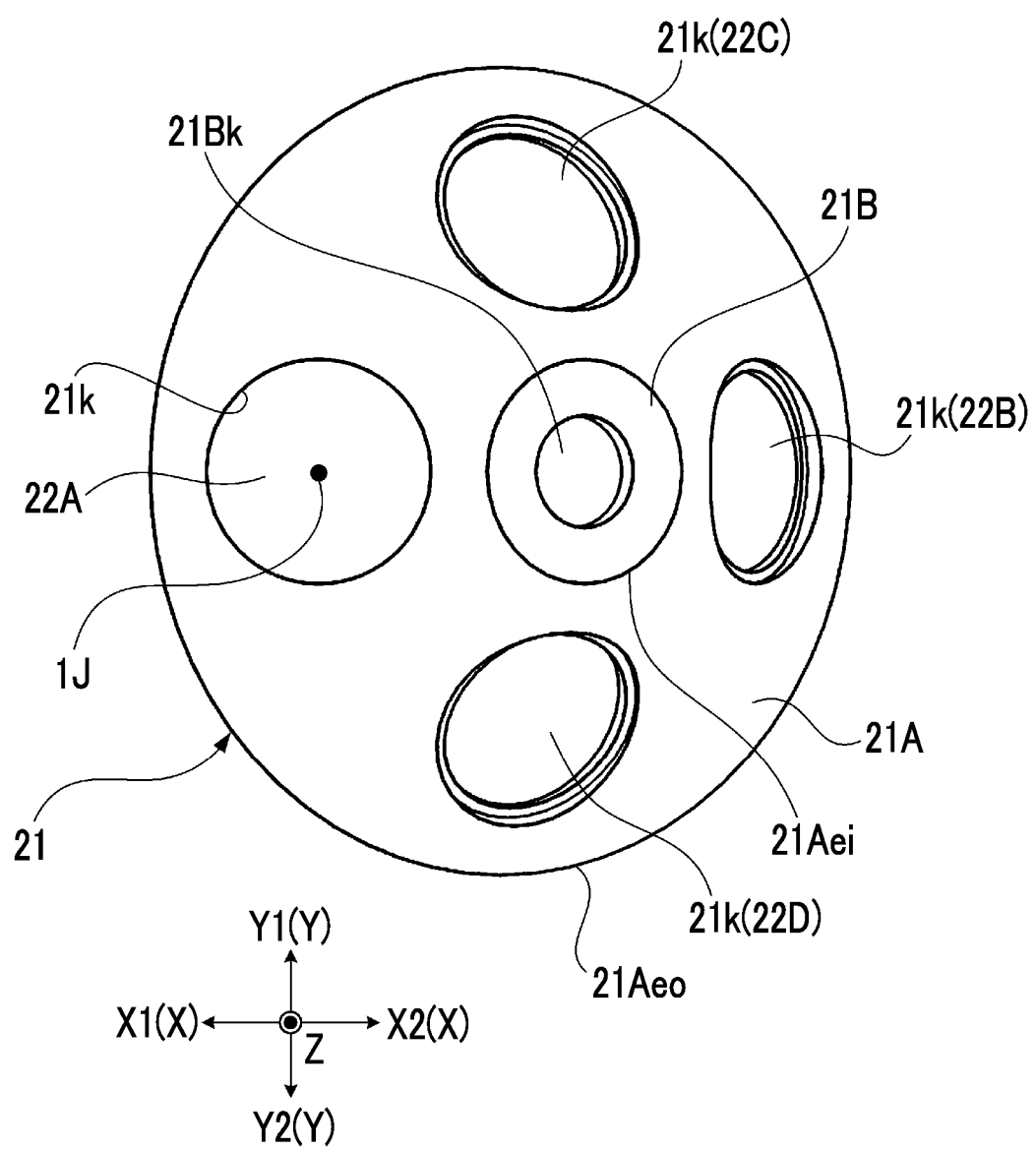
FIG. 3 is a schematic view of a rotational movement member 21 shown in FIG. 1 as viewed in a direction Z2.
Figure 4:
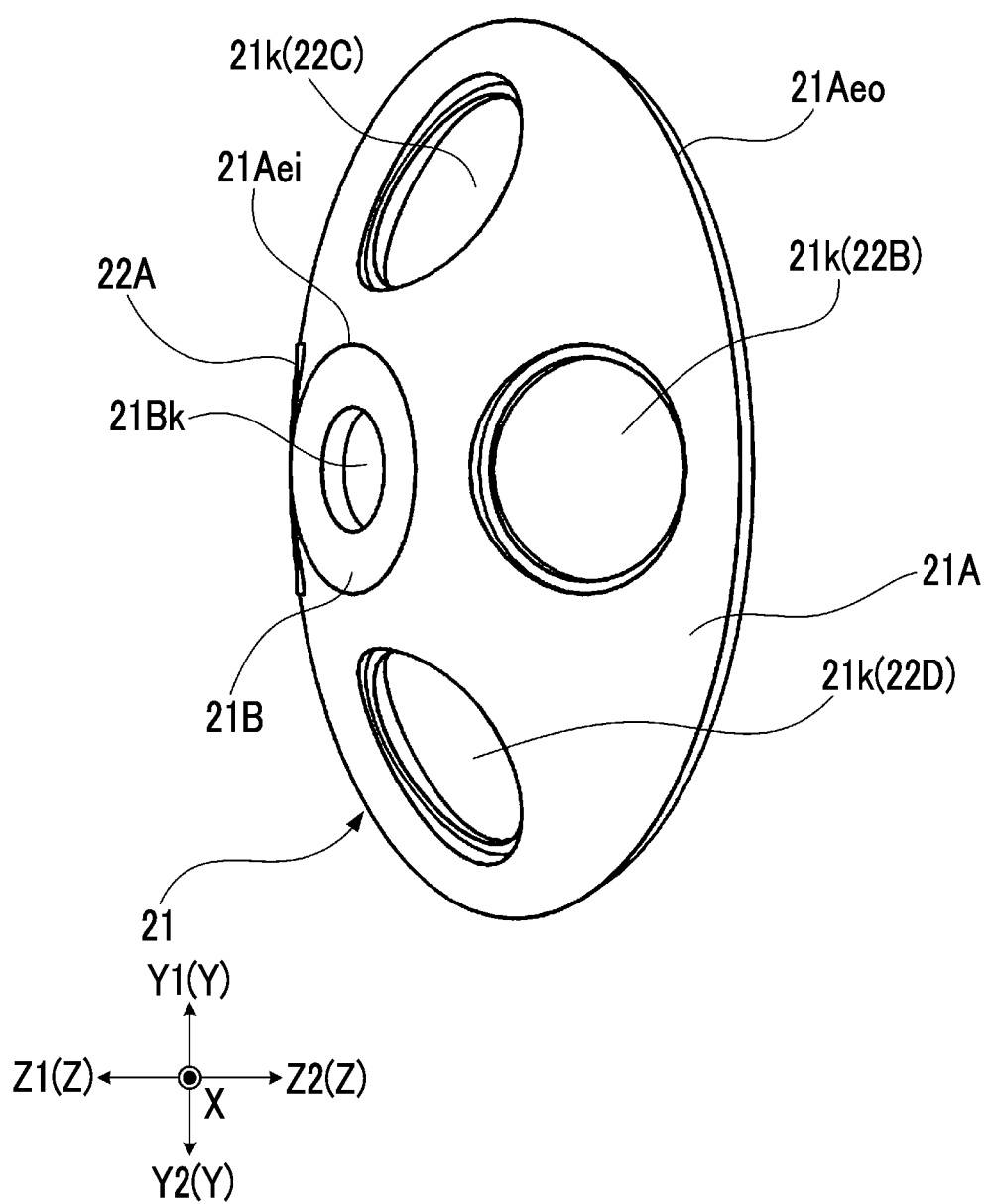
FIG. 4 is a schematic view of the rotational movement member 21 shown in FIG. 3 as viewed in a direction X1.
Figure 5:
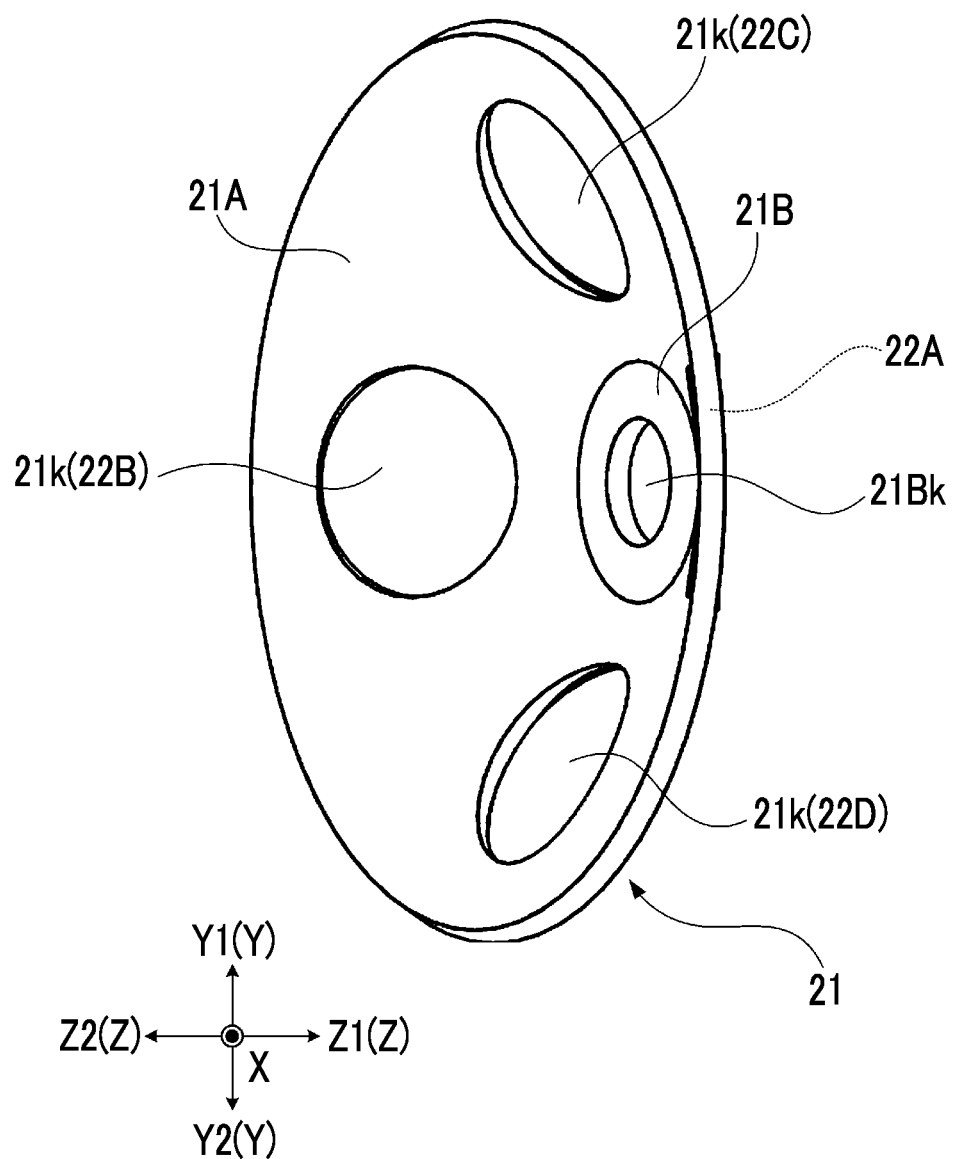
FIG. 5 is a schematic view of the rotational movement member 21 shown in FIG. 3 as viewed in a direction X2.
Figure 6:
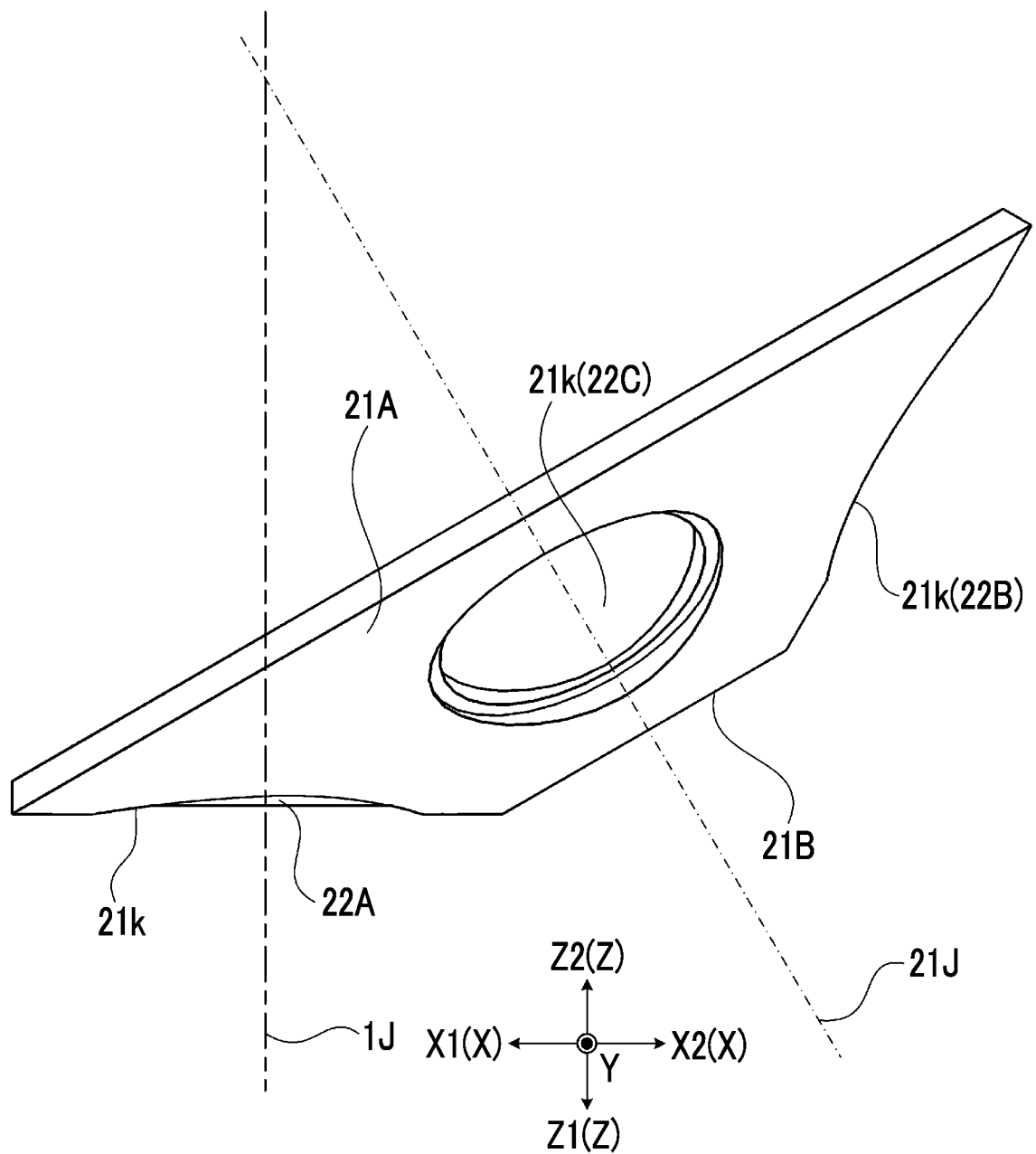
FIG. 6 is a schematic view of the rotational movement member 21 shown in FIG. 3 as viewed in a direction Y2.
Figure 7:
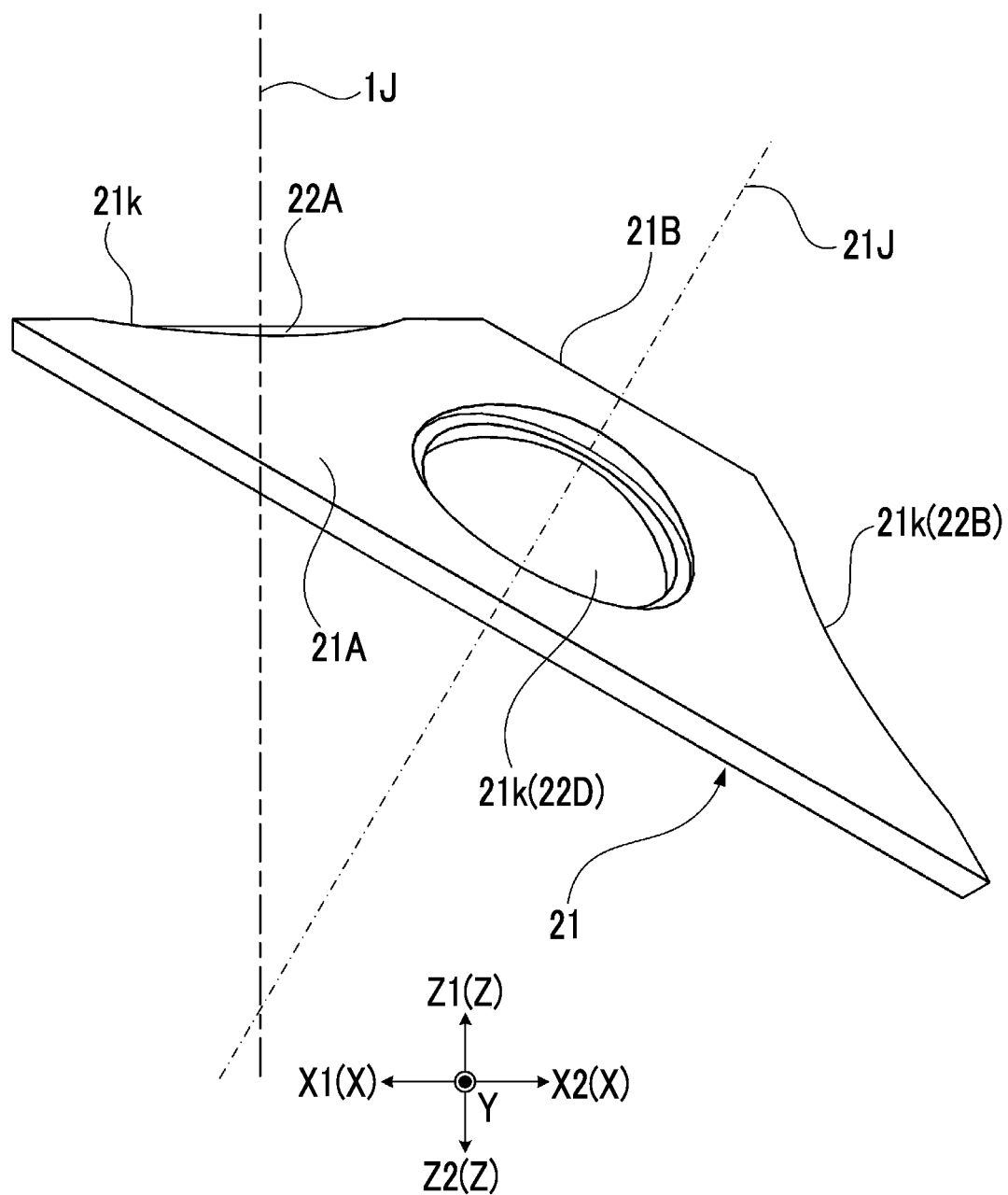
FIG. 7 is a schematic view of the rotational movement member 21 shown in FIG. 3 as viewed in a direction Y1.
Figure 8:
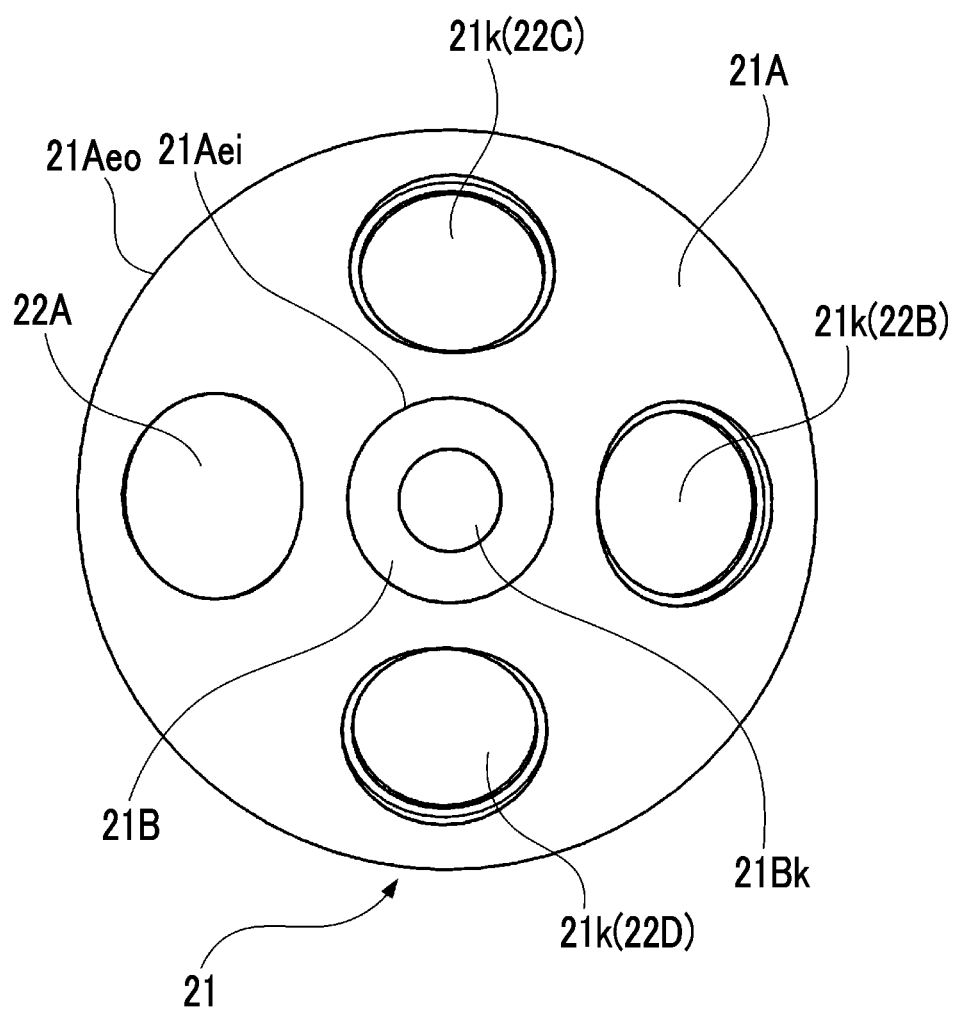
FIG. 8 is a schematic view of the rotational movement member 21 shown in FIG. 2 as viewed in the rotational movement axis direction from the objective lens 1 side.

FIG. 3 is a schematic view of the rotational movement member 21 shown in FIG. 1 as viewed in the direction Z2. FIG. 4 is a schematic view of the rotational movement member 21 shown in FIG. 3 as viewed in the direction X1. FIG. 5 is a schematic view of the rotational movement member 21 shown in FIG. 3 as viewed in the direction X2. FIG. 6 is a schematic view of the rotational movement member 21 shown in FIG. 3 as viewed in the direction Y2. FIG. 7 is a schematic view of the rotational movement member 21 shown in FIG. 3 as viewed in the direction Y1. FIG. 8 is a schematic view of the rotational movement member 21 shown in FIG. 2 as viewed in the rotational movement axis direction from the objective lens 1 side. In FIGS. 3 to 8, for understanding of the structure, a state in which, the filter is detached from the three openings among the four openings 21k formed in the rotational movement member 21 is shown.

As shown in FIGS. 3 to 8, the rotational movement member 21 is a member having an annular disc-shaped annular portion 21A where the openings 21k are formed to be circumferentially aligned, and a tubular shaft portion 21B that is formed inside the annular portion 21A and supports the shaft member 23 (in other words, the rotational movement axis 21J) inside, and a shape of a surface on the objective lens 1 side is a truncated conical shape. A circular opening 21Bk is formed at the center of the rotational movement member 21, and the shaft member 23 is supported on an inner peripheral wall of the opening 21Bk.

As shown in FIGS. 3, 4, and 8, the annular portion 21A is configured such that a position of an inner peripheral edge portion 21Aei in the rotational movement axis direction in a state of being viewed in the rotational movement axis direction is positioned on the objective lens 1 side with respect to a position of an outer peripheral edge portion 21Aeo in the rotational movement axis direction in a state of being viewed in the rotational movement axis direction. In other words, the annular portion 21A is configured to be inclined to an opposite side to the objective lens 1 side (a direction apart from the objective lens 1) with respect to a plane perpendicular to the rotational movement axis 21J.

The annular portion 21A has a plate shape having a substantially constant thickness, and an opening 21k that passes through the annular portion 21A in a thickness direction is formed. The annular portion 21A is configured to be inclined as described above, whereby the filters that are fitted into the openings 21k formed in the annular portion 21A are also configured to be inclined along the openings 21k. That is, the filter 22A, the filter 22B, the filter 22C, and the filter 22D are configured such that a light incidence surface and a light emission surface are inclined in the same direction (the direction apart from the objective lens 1) with respect to the plane perpendicular to the rotational movement axis 21J.

The optical element 2 is rotationally driven under the control of the controller 5 such that any one of the filter 22A, the filter 22B, the filter 22C, or the filter 22D is inserted into a position perpendicular to the optical axis 1J. As shown in FIG. 1, in a case where any filter is disposed on the optical path including the optical axis 1J, the light incidence surface and the light emission surface of the filter are perpendicular to the optical axis 1J. With this, it is possible to appropriately adjust subject light condensed by the objective lens 1 with the filter to guide subject light to the imaging element 4.

Figure 10:
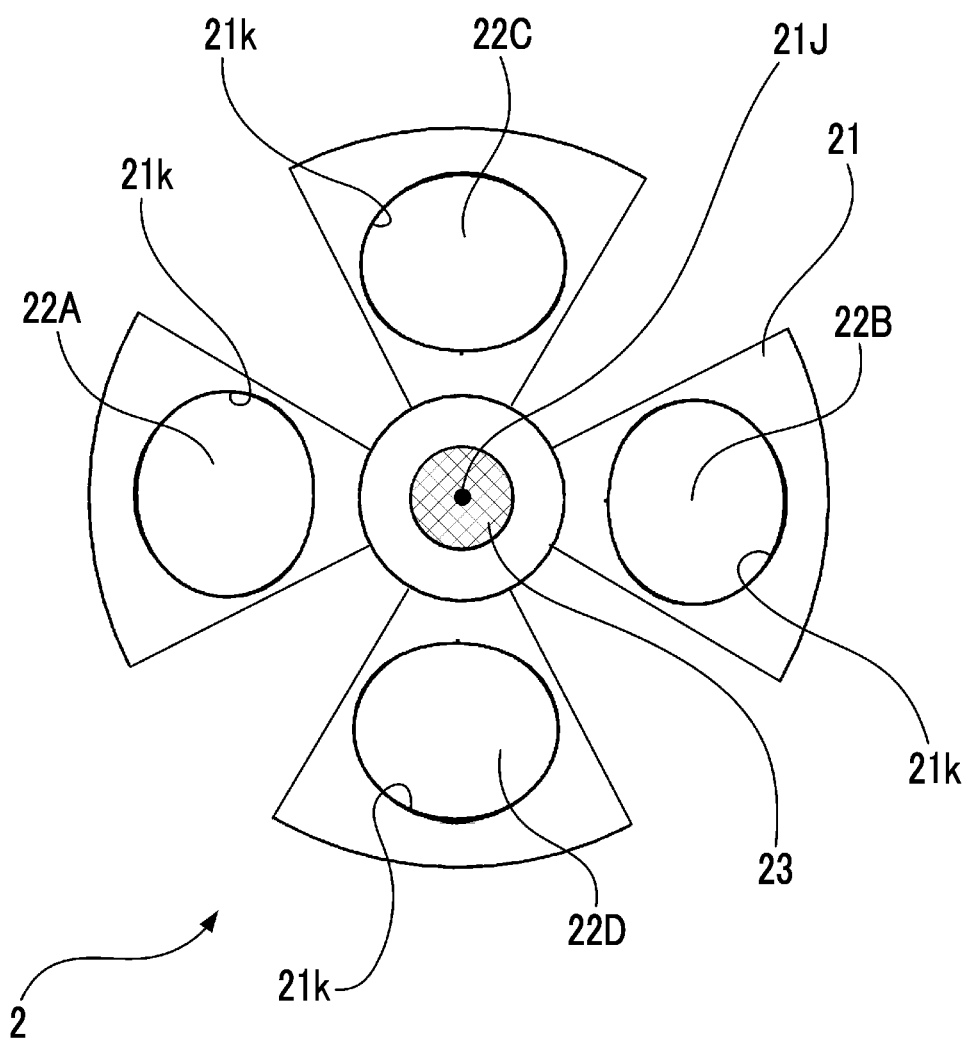
FIG. 10 is a schematic view showing a modification example of the rotational movement member 21 shown in FIG. 2.

In the optical element 2, the shape of the annular portion 21A in a state shown in FIG. 8 may not be an annular shape, and may be, for example, an elliptical annular shape. The rotational movement member 21 may be a member of which the shape of the surface on the objective lens 1 side is a truncated pyramidal shape. Alternatively, as in a modification example of a rotational movement member 21 shown in FIG. 10, the rotational movement member 21 may be configured to have a shape in which portions between the regions where the openings 21k are formed are partially notched. To achieve a reduction in size, as in a modification example of a rotational movement member 21 shown in FIG. 11, in the rotational movement member 21, the openings 21k are configured of notches notched from the outer peripheral edge portion 21Aeo of the annular portion 21A inward of the annular portion 21A in a radial direction, instead of holes.

In the imaging device 100 configured as above, the optical axis 1J of the objective lens 1 and the rotational movement axis 21J of the rotational movement member 21 are non-parallel with each other. In a reference configuration in which the optical axis 1J and the rotational movement axis 21J are parallel with each other, for example, the rotational movement member 21 is extended to a position indicated by a broken line CP of FIG. 1. Accordingly, with the imaging device 100, it is possible to reduce a width (a width Dm of FIG. 1) in the direction X of a region occupied by the rotational movement member 21 in the housing 7, compared to the reference configuration. As a result, it is possible to achieve a reduction in size of the imaging device 100. In particular, in a case where the optical axis 1J and the rotational movement axis 21J are in a twisted relationship, since it is easy to design for restraining interference of the drive unit 6 for rotationally driving the rotational movement member 21 and an optical path of a ray that passes through the objective lens 1, it is possible to achieve a further reduction in size or a reduction in manufacturing cost.

Figure 12:
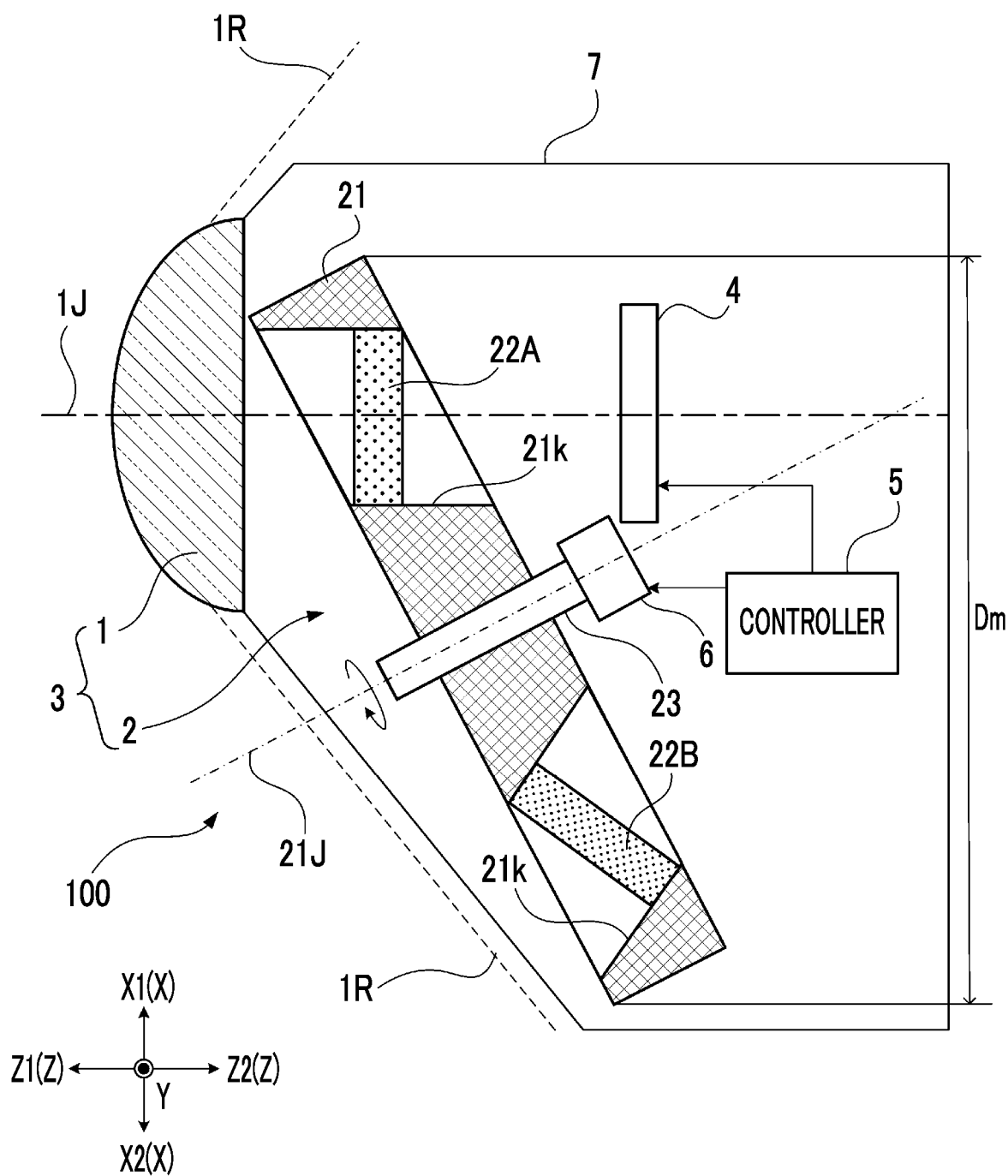
FIG. 12 is a diagram showing a modification example of the imaging device 100 shown in FIG. 1, and is a schematic sectional view of a configuration in which the rotational movement member 21 has a flat plate shape, corresponding to FIG. 1.

Even though the rotational movement member 21 has a flat plate shape, it is possible to obtain the effect of the reduction in size with a configuration in which the optical axis 1J and the rotational movement axis 21J are non-parallel with each other. FIG. 12 is a diagram showing a modification example of the imaging device 100 shown in FIG. 1 and is a schematic sectional view of a configuration in which the rotational movement member 21 has a flat plate shape, corresponding to FIG. 1. In the example of FIG. 12, the rotational movement member 21 is a disc-shaped member in which the rotational movement axis 21J is provided at the center. Then, the filters that are fitted into the four openings 21k of the rotational movement member 21 are provided to be inclined in a direction away from the objective lens 1 with respect to a surface (that is, a surface perpendicular to the rotational movement axis 21J) of the rotational movement member 21 on the objective lens 1 side in the rotational movement axis direction. Even in the configuration shown in FIG. 12, it is possible to reduce a width (a width Dm of FIG. 12) in the direction X of the region occupied by the rotational movement member 21 in the housing 7, compared to the reference configuration in which the optical axis 1J and the rotational movement axis 21J are parallel with each other.

In the imaging device 100, as the optical axis 1J and the rotational movement axis 21J are non-parallel with each other, as shown in FIG. 1 or 12, it is possible to design the optical element 2 such that a ray 1R incident on the objective lens 1 is not blocked by at least one of the rotational movement member 21 or each filter. In the reference configuration in which the optical axis 1J of the objective lens 1 and the rotational movement axis 21J of the rotational movement member 21 are parallel with each other, the ray 1R and the optical element 2 intersect at a position near the objective lens 1 in the optical axis direction Z. For this reason, in a case where an objective lens of which a full angle of view exceeds 180 degrees is employed as the objective lens 1, the full angle of view may not be effectively utilized. With the imaging device 100, even though an objective lens of which the full angle of view exceeds 180 degrees is employed as the objective lens 1, it is possible to image the subject with the full angle of view without omission.

In the imaging device 100, the rotational movement member 21 has a non-flat plate shape (specifically, a plate shape warped in the rotational movement axis direction). According to this configuration, it is possible to further reduce the width Dm, compared to the configuration of FIG. 12. As the rotational movement member 21 has a non-flat plate shape, it is possible to achieve a reduction in thickness and a reduction in weight of the rotational movement member 21, to reduce a manufacturing cost of the imaging device 100, or to reduce the weight of the imaging device 100.

Figure 11:
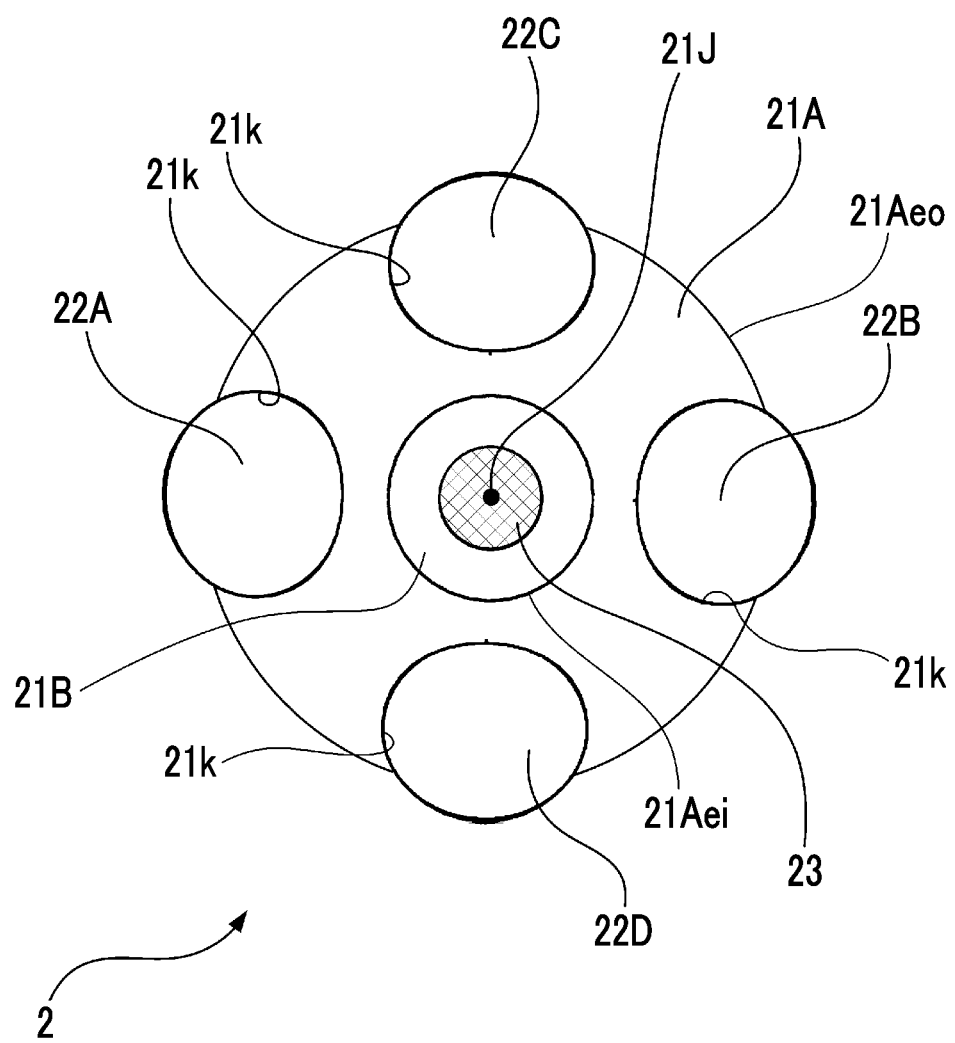
FIG. 11 is a schematic view showing a modification example of the rotational movement member 21 shown in FIG. 2.
Figure 13:
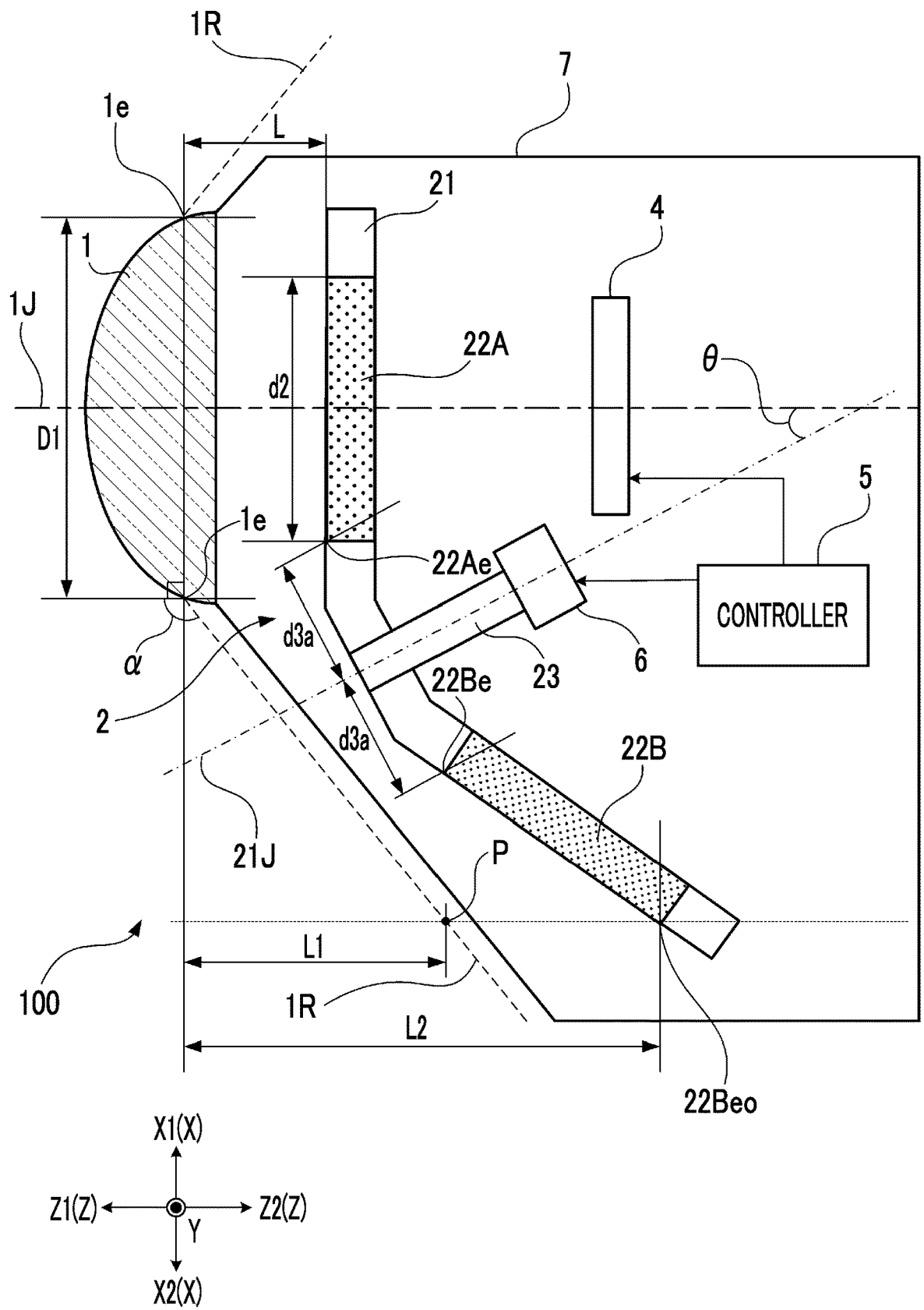
FIG. 13 is a schematic view illustrating design conditions of the optical element 2, and is a diagram corresponding to FIG. 1.

Next, a preferred condition for restraining the ray 1R incident on the objective lens 1 from being blocked by at least one of the rotational movement member 21 or each filter will be described. An edge outward of the rotational movement member 21 in the radial direction in the optical element 2 can be formed inside with respect to the filter, as shown in FIG. 11. For this reason, the ray 1R incident on the objective lens 1 is restrained from being blocked by each filter provided in the rotational movement member 21, whereby it is also possible to restrain the ray 1R incident on the objective lens 1 from being blocked by the rotational movement member 21. FIG. 13 is a schematic view illustrating the design condition of the optical element 2 and is a diagram corresponding to FIG. 1.

As shown in FIG. 13, a state in which a state of one filter (in the example of FIG. 13, the filter 22A) vertically intersecting the optical axis 1J is viewed in the direction Y is defined as an observation state. In the observation state, a distance between an edge 1e on the optical element 2 side of a light passage range on a surface on a subject side of the objective lens 1 and an edge on the objective lens 1 side of the filter 22A intersecting the optical axis 1J is referred to as L. An effective diameter of the objective lens 1 is referred to as D1. A length in the direction X of the filter 22A intersecting the optical axis 1J is referred to as d2. A distance between an edge 22Ae on a rotational movement axis 21J side and on the objective lens 1 side of the filter 22A intersecting the optical axis 1J and an edge 22Be on the rotational movement axis 21J side and on the objective lens 1 side of the filter 22B not intersecting the optical axis 1J is referred to as d3. The distance d3 corresponds to a sum of a distance d3a between the edge 22Ae and the rotational movement axis 21J and a distance between the edge 22Be and the rotational movement axis 21J, equal to the distance d3a. That is, the distance d3=2×d3a. An angle between the optical axis 1J and the rotational movement axis 21J is referred to as θ. ½ of the full angle of view of the objective lens 1 is referred to as α.

In a case where such definitions are performed, in the observation state shown in FIG. 13, a distance L2 between an edge 22Beo on the objective lens 1 side of the filter 22B not intersecting the optical axis 1J and on an outer peripheral edge portion side of the rotational movement member 21 and the edge 1e of the objective lens 1 is represented by Expression (A) described below. In a case where an intersection of a straight line that passes through the edge 22Beo and extends in the optical axis direction Z and the ray 1R is referred to as P, a distance L1 between the edge 1e of the objective lens 1 and the intersection P is represented by Expression (B) described below.

$$L2=|L+d3*\sin(\theta)+d2*\sin(2\theta)| \quad (A)$$

$$L1=|\{d2/2+d3*\cos(\theta)+d2*\cos(2\theta)-D½\}*\cos(\alpha)| \quad (B)$$

The objective lens 1 and the optical element 2 are designed such that L1 and L2 obtained by Expression (A) and Expression (B) have a relationship of L1<L2, whereby it is possible to restrain the ray 1R from being blocked by the optical element 2.

In the above description, although an example where the four filters (light transmissive regions) are provided in the rotational movement member 21 has been described, at least two light transmissive regions may be present in the rotational movement member 21. For example, a configuration may be made in which two openings 21k (for example, two openings 21k vertically arranged in FIG. 2) that face each other with the rotational movement axis 21J sandwiched therebetween and the filters that are fitted into the two openings 21k are deleted in the rotational movement member 21.

Figure 14:
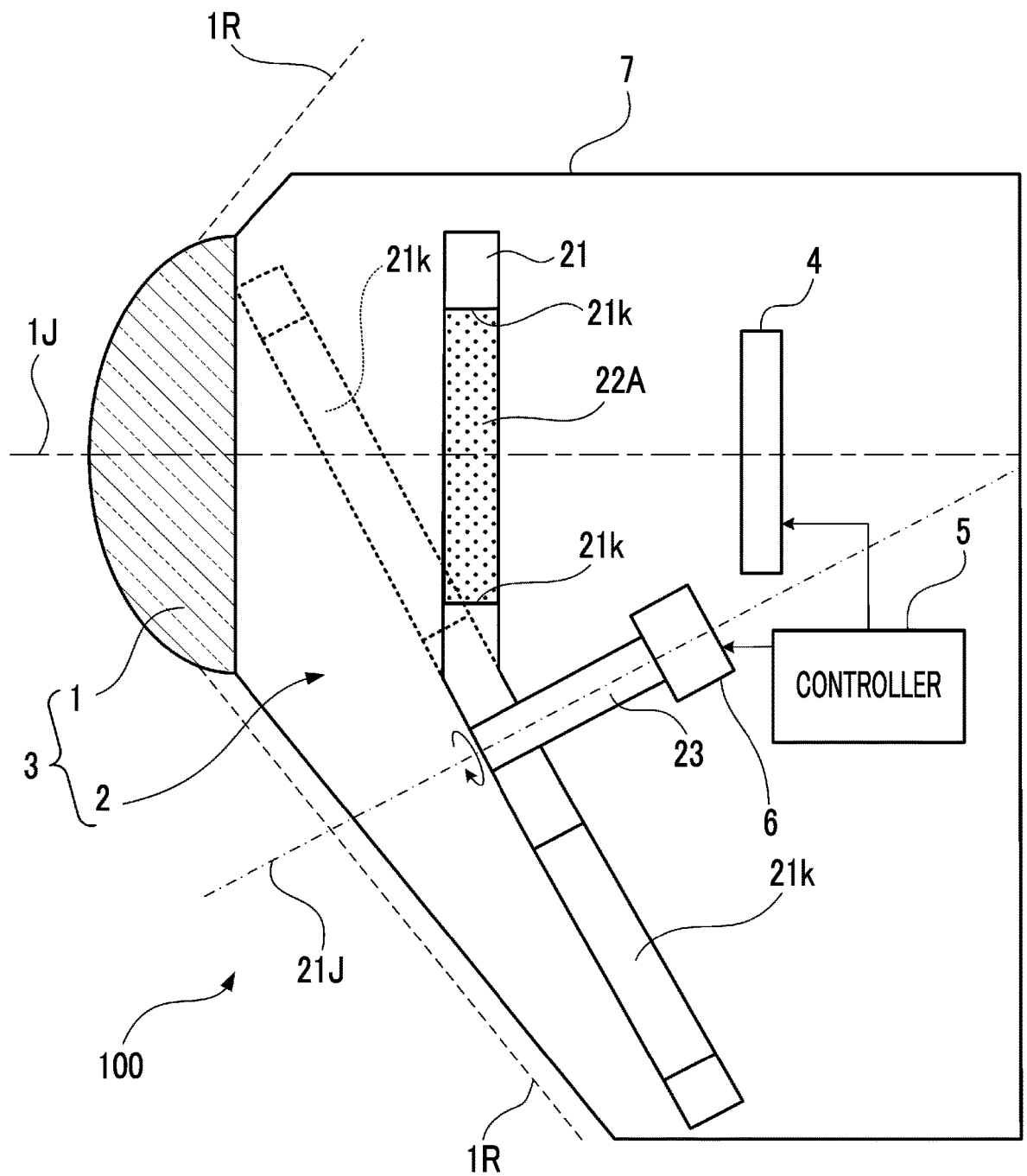
FIG. 14 is a schematic sectional view showing a modification example of the optical element 2 in the imaging device 100 shown in FIG. 1.

FIG. 14 is a schematic sectional view showing a modification example of the optical element 2 in the imaging device 100 shown in FIG. 1. A rotational movement member 21 of an optical element 2 shown in FIG. 14 has, for example, a configuration in which a flat plate that extends in the direction X and is perpendicular to the optical axis 1J is bent in a direction apart from the objective lens 1 near the rotational movement axis 21J. Then, in the rotational movement member 21, two openings 21k are formed at positions that face each other with the rotational movement axis 21J sandwiched therebetween, and the filter 22A is fitted into only one of the two openings 21k. In a case where the rotational movement member 21 rotates by 180 degrees around the rotational movement axis 21J from the state of FIG. 14, the opening 21k into which no filter is fitted reaches a position indicated by a broken line in the drawing. In this state, light condensed by the objective lens 1 passes through the opening 21k directly and reaches the imaging element 4. On the other hand, in the state shown in FIG. 14, light condensed by the objective lens 1 passes through the filter 22A and reaches the imaging element 4.

In this way, even with the configuration of the optical element 2 shown in FIG. 14, it is possible to achieve a reduction in size, a reduction in cost, and the like of the imaging device 100. A configuration can be made in which the ray 1R is not blocked by the optical element 2.

Figure 15:
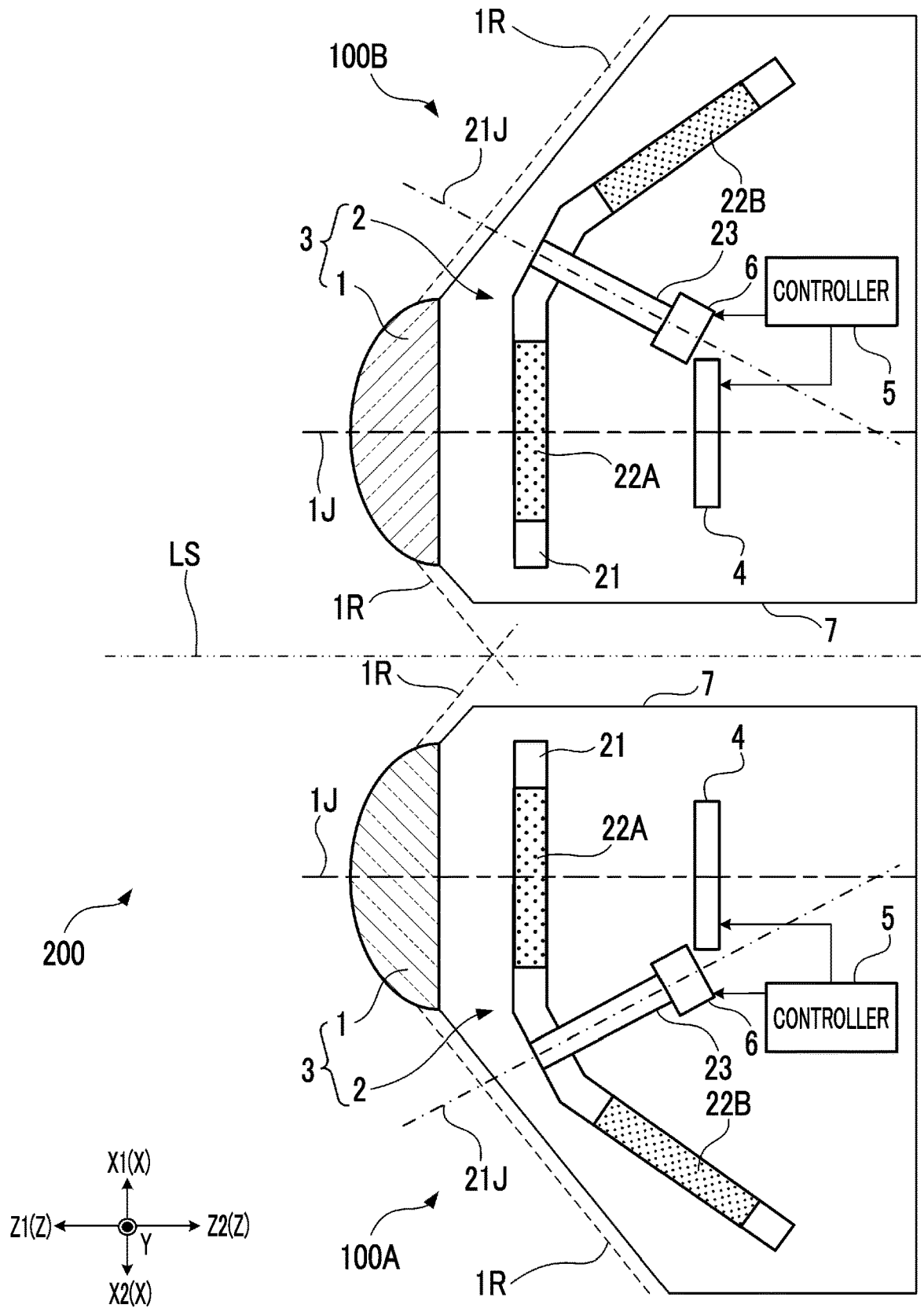
FIG. 15 is a schematic sectional view showing the schematic configuration of an imaging device 200 that is another embodiment of an imaging device of the present invention.

FIG. 15 is a schematic sectional view showing the schematic configuration of an imaging device 200 that is another embodiment of an imaging device of the present invention. The imaging device 200 comprises an imaging device 100A having the same configuration as the imaging device 100 shown in FIG. 1, and an imaging device 100B having the same configuration as the imaging device 100 shown in FIG. 1. A lens device 3 included in the imaging device 100A configures a first lens device, a lens device 3 included in the imaging device 100B configures a second lens device, and a lens device is configured of the first lens device and the second lens device.

The imaging device 100A and the imaging device 100B are disposed to be aligned at a distance in the direction X. An optical axis 1J of an objective lens 1 of the imaging device 100A and an optical axis 1J of an objective lens 1 of the imaging device 100B are parallel with each other, and FIG. 15 shows a straight line LS that extends in the optical axis direction Z at an intermediate position of the two optical axes 1J. The imaging device 100A and the imaging device 100B are disposed in a relationship of line symmetry with the straight line LS as an axis.

A controller 5 of the imaging device 100A and a controller 5 of the imaging device 100B are configured to be communicable with each other. A housing 7 may be shared by the imaging device 100A and the imaging device 100B. The controller 5 may be shared by the imaging device 100A and the imaging device 100B.

With the imaging device 200, it is possible to image a subject in a wide range with the two sets of lens devices 3 and imaging elements 4 disposed with parallax. With this, it is possible to record a stereoscopic image by processing the images captured with the two imaging elements 4.

In FIG. 15, a modified configuration can also be made in which the imaging device 100A is reversed such that the end on the direction X1 side and the end on the direction X2 side are turned upside down, and the imaging device 100B is reversed such that the end on the direction X1 side and the end on the direction X2 side are turned upside down. In contrast with the modified configuration, as shown in FIG. 15, with a configuration in which the rotational movement axis 21J of each of the imaging device 100A and the imaging device 100B is disposed outward with respect to the optical axis 1J of each of the imaging device 100A and the imaging device 100B, it is possible to obtain an effect of easily reducing a distance between the two objective lenses 1 and an effect of increasing the appearance of the entire device.

The imaging device 100 described above can also be changed to a projection device, such as a projector, by substituting the imaging element 4 with a display element. Similarly, the imaging device 200 can also be changed to a projection device by substituting each of the two imaging elements 4 with a display element. The display element is, for example, a liquid crystal panel, liquid crystal on silicon (LCOS), or a digital micromirror device (DMD).

In a case where each of the imaging device 100 and the imaging device 200 is changed to a projection device, the objective lens 1 serves as a projection lens that projects an image displayed on the display element onto a projection target. The objective lens 1 is an optical element closest to the projection target, such as a spherical screen. The ray 1R serves as a ray that is projected from the outermost edge of the range of the effective diameter of the objective lens 1. In this way, even in the projection device, the configuration of the optical element 2 is employed, whereby it is possible to achieve a reduction in size, vignetting prevention of the ray 1R, and the like.

Although the objective lens 1 in the imaging device or the projection device described above is a lens of which the full angle of view exceeds 180 degrees, even though a lens of which the full angle of view is equal to or less than 180 degrees is used, it is possible to obtain an effect of a reduction in size.

As described above, at least the following matters are disclosed in the specification.

(1)

An optical system that is disposed on an opposite side to an object side with respect to an objective lens, the optical system including a rotational movement member that is rotationally movably supported, and a plurality of light transmissive regions that are formed in the rotational movement member, are configured to be able to be disposed at a position intersecting an optical axis of the objective lens, and have different light transmission characteristics, in which a rotational movement axis of the rotational movement member is configured to be non-parallel with the optical axis of the objective lens.

(2)

The optical system according to (1), in which at least one set of the plurality of light transmissive regions is provided to be inclined in the same direction with respect to a plane perpendicular to the rotational movement axis.

(3)

The optical system according to (2), in which the same direction is a direction away from the objective lens.

(4)

The optical system according to any one of (1) to (3), in which the objective lens is a lens of which a full angle of view exceeds 180 degrees.

(5)

The optical system according to (4), in which the rotational movement member is in a shape of restraining a ray incident on an outermost edge of a range of an effective diameter of the objective lens or a ray projected from the outermost edge of the range of the effective diameter of the objective lens from being blocked by at least one of the light transmissive region or the rotational movement member.

(6)

The optical system according to any one of (1) to (5), in which the rotational movement member has a non-flat plate shape.

(7)

The optical system according to (6), in which the rotational movement member has an annular portion in which the plurality of light transmissive regions are formed to be circumferentially aligned, and a shaft portion that is formed inside the annular portion and has the rotational movement axis formed inside, the annular portion is configured such that, in a state of being viewed in a rotational movement axis direction in which the rotational movement axis extends, a position of an inner peripheral edge portion in the rotational movement axis direction is positioned on an objective lens side with respect to a position of an outer peripheral edge portion in the rotational movement axis direction in a state of being viewed in the rotational movement axis direction.

(8)

The optical system according to (7), in which the objective lens is a lens of which a full angle of view exceeds 180 degrees, the plurality of light transmissive regions are formed in the annular portion to be aligned at regular intervals, in a case where two directions that are perpendicular to the optical axis and are perpendicular to each other are referred to as a first direction and a second direction, a state in which a state of one light transmissive region vertically intersecting the optical axis is viewed from the first direction is referred to as an observation state, and in the observation state, a distance between an edge on the optical system side of a light passage range on a surface on the object side of the objective lens and an edge on the objective lens side of the light transmissive region intersecting the optical axis is L, an effective diameter of the objective lens is D1, a length in the second direction of the light transmissive region intersecting the optical axis is d2, a value of two times of a distance between an edge on a rotational movement axis side and on the objective lens side of the light transmissive region intersecting the optical axis and the rotational movement axis is d3, an angle between the optical axis and the rotational movement axis is θ, ½ of a full angle of view of the objective lens is α, $|\{d2/2+d3*\cos(\theta)+d2*\cos(2\theta)-D^{1/2}\}*\cos(\alpha)|$ is $L1$, and $|L+d3*\sin(\theta)+d2*\sin(2\theta)|$ is $L2$, a relationship of L1<L2 is established.

(9)

The optical system according to any one of (1) to (8), in which the rotational movement axis is in a twisted relationship with the optical axis.

(10)

A lens device including the optical system according to any one of (1) to (9), and the objective lens.

(11)

A lens device including a first lens device that is the lens device according to (10), and a second lens device that is the lens device according to (10) and is set in parallel with the first lens device.

(12)

The lens device according to (11), in which the first lens device and the second lens device are set in parallel in a state in which the optical systems are in a relationship of line symmetry.

(13)

The lens device according to (12), in which the rotational movement axis of each of the first lens device and the second lens device is disposed outside the optical axis of each of the first lens device and the second lens device.

(14)

An imaging device including the lens device according to (10), and an imaging element that images a subject through the lens device.

(15)

An imaging device including the lens device according to any one of (11) to (13), and an imaging element that images a subject through the first lens device and the second lens device.

(16)

A projection device including the lens device according to (10), and a display element, in which an image that is displayed by the display element is projected through the lens device.

(17)

A projection device including the lens device according to any one of (11) to (13), and a display element, wherein an image that is displayed by the display element is projected through the first lens device and the second lens device.

EXPLANATION OF REFERENCES

1J: optical axis
1R: ray
1e, 22Ae, 22Be, 22Beo: edge
1: objective lens
2: optical element
3: lens device
4: imaging element
5: controller
6: drive unit
7: housing
21A: annular portion
21B: shaft portion
21J: rotational movement axis
21Aei: inner peripheral edge portion
21Bk, 21k: opening
21Aeo: outer peripheral edge portion
21: rotational movement member
22A, 22B, 22C, 22D: filter
23: shaft member
100A, 100B, 100, 200: imaging device
P: intersection

What is claimed is:

1. An optical system that is disposed on an opposite side to an object side with respect to an objective lens, the optical system comprising:

a rotational movement member that is rotationally movably supported; and a plurality of light transmissive regions that are formed in the rotational movement member, are configured to be able to be disposed at a position intersecting an optical axis of the objective lens, and have different light transmission characteristics, wherein a rotational movement axis of the rotational movement member is configured to be non-parallel with the optical axis of the objective lens, wherein the objective lens is a lens of which a full angle of view exceeds 180 degrees, wherein the rotational movement member has a shape of restraining a ray incident on an outermost edge of a range of an effective diameter of the objective lens or a ray projected from the outermost edge of the range of the effective diameter of the objective lens from being blocked by at least one of the light transmissive regions or the rotational movement member.

2. The optical system according to claim 1, wherein at least one set of the plurality of light transmissive regions is provided to be inclined in a same direction with respect to a plane perpendicular to the rotational movement axis.

3. The optical system according to claim 2, wherein the same direction is a direction away from the objective lens.

4. The optical system according to claim 1, wherein the rotational movement member has a non-flat plate shape.

5. The optical system according to claim 4, wherein the rotational movement member has an annular portion in which the plurality of light transmissive regions are formed to be circumferentially aligned, and a shaft portion that is formed inside the annular portion and has the rotational movement axis formed inside the shaft portion, and
the annular portion is configured such that a position of an inner peripheral edge portion of the annular portion in the rotational movement axis direction in a state of being viewed in a rotational movement axis direction in which the rotational movement axis extends is positioned nearer to the objective lens than a position of an outer peripheral edge portion of the annular portion in the rotational movement axis direction in a state of being viewed in the rotational movement axis direction.

6. The optical system according to claim 5, wherein the objective lens is a lens of which a full angle of view exceeds 180 degrees,
the plurality of light transmissive regions are formed in the annular portion to be aligned at regular intervals, and
in a case where two directions that are perpendicular to the optical axis and are perpendicular to each other are referred to as a first direction and a second direction, a state in which a state of one light transmissive region among the plurality of light transmissive regions vertically intersecting the optical axis is viewed from the first direction is referred to as an observation state, and
in the observation state,
a distance between an edge, on a side of the optical system, of a light passage range on a surface on the object side of the objective lens and an edge, on a side of the objective lens, of the light transmissive region intersecting the optical axis is L,
an effective diameter of the objective lens is D1,
a length, in the second direction, of the light transmissive region intersecting the optical axis is d2,
a value of two times of a distance between an edge, on a side of the rotational movement axis and a side of the objective lens, of the light transmissive region intersecting the optical axis and the rotational movement axis is d3,
an angle between the optical axis and the rotational movement axis is θ,
½ of a full angle of view of the objective lens is α, $|\{d2/2+d3*\cos(\theta)+d2*\cos(2\theta)-D\frac{1}{2}\}*\cos(\alpha)|$ is $L1$, and $|L+d3*\sin(\theta)+d2*\sin(2\theta)|$ is $L2$, a relationship of $L1<L2$ is satisfied.

7. The optical system according to claim 1, wherein the rotational movement axis is in a twisted relationship with the optical axis.

8. A lens device comprising:
the optical system according to claim 1; and
the objective lens.

9. A lens device comprising:
a first lens device that is the lens device according to claim 8; and
a second lens device that is the lens device according to claim 8 and is set in parallel with the first lens device.

10. The lens device according to claim 9, wherein the first lens device and the second lens device are set in parallel in a state in which the optical system of the first lens device and the optical system of the second lens device are in a relationship of line symmetry.

11. The lens device according to claim 10, wherein the rotational movement axis of each of the first lens device and the second lens device is disposed nearer to an opposite side to a side at which the first lens device and the second lens device face each other, than the optical axis of the each of the first lens device and the second lens device.

12. An imaging device comprising:
the lens device according to claim 8; and
an imaging element that images a subject through the lens device.

13. An imaging device comprising:
the lens device according to claim 9; and
an imaging element that images a subject through the first lens device and the second lens device.

14. A projection device comprising:
the lens device according to claim 8; and
a display element,
wherein an image that is displayed by the display element is projected through the lens device.

15. A projection device comprising:
the lens device according to claim 9; and
a display element,
wherein an image that is displayed by the display element is projected through the first lens device and the second lens device.

* * * * *